Dec. 14, 1948.  J. C. COLLINS  2,456,491
TRACTOR IMPLEMENT
Filed Sept. 4, 1945  2 Sheets-Sheet 1
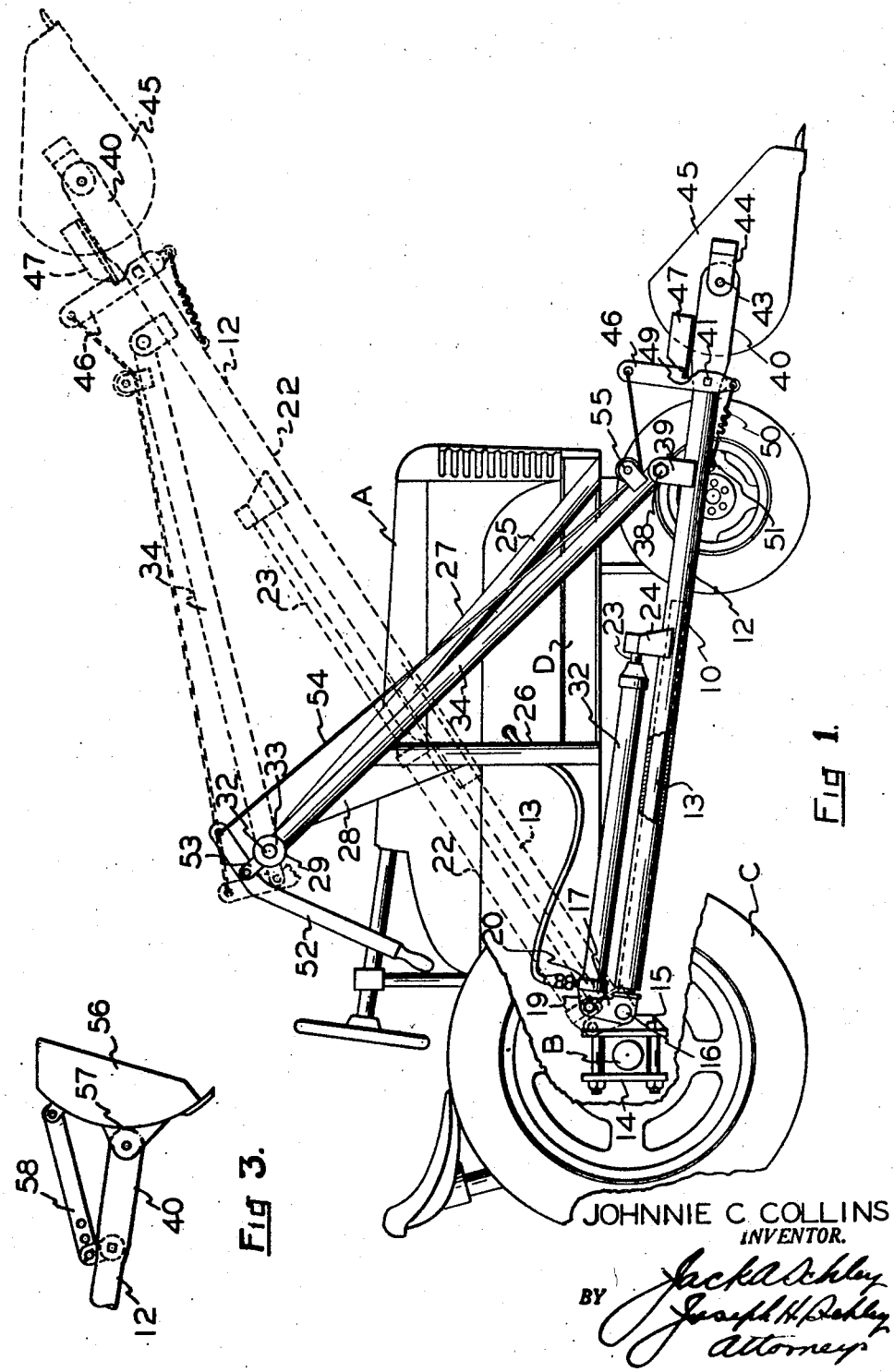
JOHNNIE C. COLLINS
INVENTOR.
BY Jack A. Ashley
Joseph H. Ashley
Attorney

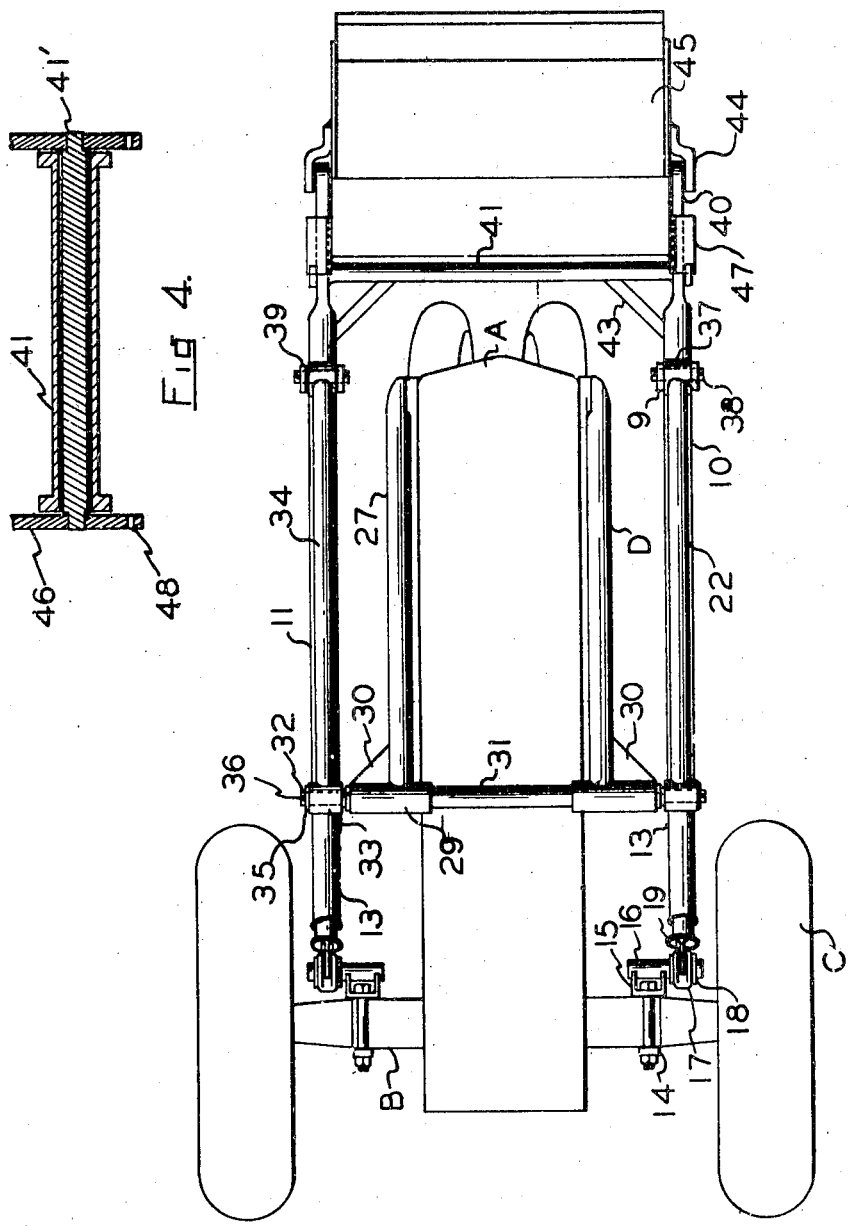

Patented Dec. 14, 1948

2,456,491

UNITED STATES PATENT OFFICE 2,456,491

TRACTOR IMPLEMENT

Johnnie C. Collins, Dallas, Tex., assignor to Servis Equipment Company, Dallas, Tex.

Application September 4, 1945, Serial No. 614,183

7 Claims. (Cl. 214—141)

This invention relates to new and useful improvements in tractor implements.

One object of the invention is to provide an improved implement which may be attached to a tractor and which includes means for supporting and elevating a scoop, bulldozer blade or other tool.

A particular obect of the invention is to provide an improved implement having longitudinal telescoping push bars adapted to be pivoted to the rear axle of a tractor, together with fluid-actuated cylinders or rams and supporting linkage, whereby a load carried by the push bars may be elevated in a new and novel manner.

A further object of the invention is to provide a device of the character described in which the elements are comparatively few in number; are of rugged construction and are readily attached to an ordinary tractor.

Another object of the invention is to provide improved elevating means for a telescoping push bar which includes pivoted suspending means for the bar attached to the sleeve and a pivoted mounting support rigidly attached to the plunger of the bar, whereby a fluid actuator having its cylinder attached to the mounting support and its plunger secured to the sleeve, will cause elongation and elevation of the bar when fluid is supplied to said cylinder, and also whereby the fluid actuator may be disposed longitudinally of the push bar.

Still another object of the invention is to provide a simple link arrangement co-acting with push bars having fluid actuators attached thereto for swinging the push bars when the actuators are energized.

A still further object of the invention is to provide an improved adapter and pivoted mounting which may be clamped on the rear axle of a tractor and to the pivoted mounting of which the rear end of a telescoping push bar may be attached and also to which mounting, an actuating cylinder for the bar may be attached, thus making for rugged, compact and unique construction.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a side elevation of a tractor equipped with an implement constructed in accordance with the invention, Fig. 2 is a plan view of the same, parts being omitted for the sake of clarity, Fig. 3 is a partial side elevation of a bulldozer blade attached to the push bars, and Fig. 4 is an enlarged transverse sectional view of the latch means.

In the drawings, the numbers 10 and 11 designate elongate telescoping push bars adapted to be mounted on each side of a tractor indicated generally by the letter A. Each push bar comprises a sleeve 12 and a plunger 13 telescoping the rear end of the sleeve. While the push bars may be attached to the tractor in any suitable manner, I prefer to provide a mounting for each bar including a clamp 14 adapted to be clamped around the rear axle housing B of the tractor and having on its front side a U-shaped bracket 15 to which a stub shaft 16 is welded. The shaft projects laterally toward the adjacent wheel C, Fig. 2; however, any suitable means may be employed to support the shaft on the rear axle of a tractor. The clamp 14 and bracket 15 constitutes an adapter or fixture for attaching the implement to the rear axle of a tractor.

Each push bar is provided with a bell-crank or member 17, which is pivoted on the shaft 16 and confined between collars 18. The rear end of the plunger 13 is made integral with the short arm of the bell-crank and the center of the shaft is made coincident with the longitudinal axis of the plunger. The long arm of each bell-crank extends upwardly and is bifurcated so as to receive a flat tongue 19 projecting from the rear cap 20 of a hydraulic cylinder 22. The adapter and the member 17 pivoted thereto constitute an axle mounting for pivotally supporting the rear end of the push bar on the rear axle. The piston rod 23 of the cylinder has its forward end secured in a lug 24 welded on the upper side of the sleeve 12 at the medial portion thereof. The cylinder is attached to the push bar so that its longitudinal axis lies substantially parallel with the longitudinal axis of said bar.

It is obvious that when pressure fluid is supplied to the end of the cylinder 22 and the piston rod 23 thus driven forwardly, the sleeve 12 will be moved forwardly and the push bar thereby extended or elongated. There is quite an advantage in this arrangement over using the sleeve as a hydraulic cylinder as has been common in this art. If the sleeve is used as a hydraulic or fluid cylinder, its inner surface must be machined and finished, whereas by using a comparatively short hydraulic cylinder, exteriorly of the bar, the plunger 13 and sleeve 12 may be made of ordinary stock and of more rugged construction.

For swinging the push bars upwardly when their sleeves are extended, simple linkage is provided on each side of the tractor. On each side of the frame D, at the forward end of the tractor, an upright triangular frame 25 is mounted. Each frame 25 includes a standard 26 having its lower end suitably secured to the tractor frame and its upper end welded to the under side of an inclined strut 27. The lower end of the strut is suitably fastened to the forward end of the tractor frame; while its upper end overhangs the standard, rearwardly thereof, and is braced by a gusset 28.

On the upper end of each strut 27 a bearing sleeve 29 is welded and each sleeve extends outwardly, being braced by a gusset 30 connected therewith and secured to the strut. A transverse rock shaft 31 is journaled in the sleeves and has a reduced stud 32 at each end. Bearing collars 33 integral with the upper end of links 34, are journaled on the studs and confined by washers 35 and cotter pins 36. As will be seen from Fig. 2, the links 34 overlie the push bars and have at their lower ends, collars 37 journaled on pins 38 and confined between ears 39 welded on each side of the sleeves 12. When the sleeves 12 are extended they will swing the links, whereby the push bars will be elevated as is shown in dotted lines in Fig. 1.

The forward ends of the sleeves 12 are reduced or flattened to form forwardly extending tongues 40. Near their juncture with the sleeves, the tongues are welded to the ends of a transverse tie tube 41. The tube 41 and the sleeves are connected by angularly disposed braces 42. The push bars with the tie tube constitute a generally U-shaped frame, which while sufficiently rugged to withstand longitudinal thrusts, is flexible enough to permit moderate transverse twisting, thereby imparting flexibility.

Forwardly of the tube 41 a scoop or shovel 45 of the usual construction is pivoted between the tongues 40. The tongues have outwardly directed trunnions 43 at their forward ends and offset keepers 44 welded to the wings of the scoop are pivoted on these trunnions, whereby the tongues are confined between the scoop wings and the keepers.

It will be observed that the scoop 45 is shown in full lines in Fig. 1 in position to scoop up the soil as the tractor is driven forwardly; and in dotted lines, in position to dump its contents into a truck (not shown). In order to hold the scoop in position, latch means is provided and such means includes a latch lever 46 and a latch bar 46' and stop lugs 47 for each side of said scoop. A square shaft 41' extends through the tube 41 and the tongues 40 and projects beyond the same at each end. The latch lever is fastened on one end of the shaft, while the latch bar 46' is fastened on the opposite end of said shaft. When the latch lever is swung, the shaft is rocked and the latch bar and levers are retracted from the lugs. The lever and bar have notches 49 for engaging the lugs. The lugs are made of short pieces of angle bars and are welded to the outer faces of the wings of the scoop, so that when the latter is in loading position, the lugs will rest upon the upper edges of the tongues and engage in the notches 49. For making the lever and bar self latching, a coiled spring 50 is attached to an ear 48 on the lower end of the lever 46 and has its rear end fastened in an ear 51 depending from the adjacent sleeve 12.

When the push bars 10 and 11 are elevated, the latches will maintain the scoop in position and prevent it from dumping its load. When the scoop has been elevated as is shown in dotted lines in Fig. 2, it is desirable to release the scoop and permit it to swing and dump its load. For releasing the latches, hand levers 52 are pivoted near their upper ends to ears 53 provided on the bearing sleeves 29. The upper ends of the levers are connected with the upper ends of the latch bars 46, by means of cables 54, which pass through guides 55 on the links 34.

The implement may be readily converted for other uses. In Fig. 3 I have shown a bulldozer blade 56 connected across the ends of the push bars. The blade 56 has brackets 57 on its rear side, whereby it is pivoted to the forward ends of the tongues 40. Inclined braces 58 are pivoted at their upper ends to the blade 56 and have their lower ends adjustably connected to lugs 59, secured to and directed upwardly from, the tube 41.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A tractor implement including, a pair of push bars each comprising a sleeve and a plunger, bell-cranks secured to the rear ends of the plungers, means for pivotally supporting the bell-cranks on the rear axle of a tractor, fluid-actuated cylinders overlying the push bars attached to the bell-cranks and having piston rods secured to the sleeves of the push bars, linkage for swingably supporting the sleeves of the push bars, and an earth tool carried by the push bar sleeves.

2. A tractor implement including, a pair of push bars each comprising a sleeve and a plunger, bell-cranks secured to the rear ends of the plungers, means for pivotally supporting the bell-cranks on the rear axle of a tractor, fluid-actuated cylinders overlying the push bars attached to the bell-cranks and having piston rods secured to the sleeves of the push bars, linkage for swingably supporting the sleeves of the push bars, an earth tool carried by the push bar sleeves, and latches mounted on the push bars and engaging the earth tool.

3. A tractor implement including, a pair of push bars each comprising a sleeve and a plunger, bell-cranks secured to the rear ends of the plungers, means for pivotally supporting the bell-cranks on the rear axle of a tractor, fluid-actuated cylinders overlying the push bars attached to the bell-cranks and having piston rods secured to the sleeves of the push bars, linkage for swingably supporting the sleeves of the push bars, a scoop carried by the push bar sleeves, and latches mounted on the push bars and engaging the scoop.

4. A tractor implement including, telescoping push bars, fluid-actuators overlying the bars, axle mountings pivotally connected to the rear ends of both the bars and the actuators adapted to be attached directly to the rear axle of a tractor, means for securing the pistons of the actuators to the bars, upright supports adapted to be attached to a tractor frame and having stub shafts at their upper ends, links pivoted at their upper ends on the shafts of said supports, means for pivoting the lower ends of said links to the bars, and an earth tool carried by the bars.

5. A tractor implement including, telescoping push bars, fluid actuators overlying the bars, axle mountings pivotally connected to the rear ends of both the bars and the actuators adapted to be attached directly to the rear axle of a tractor, means for securing the pistons of actuators to the bars, upright supports adapted to be attached to a tractor frame and having stub shafts at their upper ends, links pivoted at their upper ends on the shafts of said supports, means for pivoting the lower ends of said links to the bars, an earth tool carried by the bars, a scoop pivoted between the forward ends of the bars, stops carried by the scoop for arresting it in loading position, and latches carried by the bars for latching said scoop in loading position.

6. A tractor implement including axle mountings adapted to be fastened directly to the rear axle of a tractor and having members pivoted thereon, telescoping push bars attached at their rear ends directly to said members and having means at their forward ends for attaching a tool, fluid actuators overlying the bars having their forward ends attached to the push bars and their rear ends attached to said members, pivotal connections between the rear ends of the actuators and the members, inclined links having their lower ends pivoted to the forward ends of the push bars, and upright supports adapted to be mounted on a tractor frame and having pivot connections at their upper ends with the upper ends of the links.

7. A tractor implement including, a pair of push bars each including a sleeve and a plunger extending from the rear end of the sleeve, pivot members attached to the rear ends of the plungers, axle fixtures pivoted to said members, fluid actuators extending longitudinally over the push bar sleeves having forwardly extending pistons attached to their outer ends to the medial portions of the sleeves, the rear ends of the actuators being secured to the pivot members, an earth tool mounted on the forward ends of the sleeves, upright supports adapted to be mounted on the sides of a tractor, and links having their lower ends pivoted to the sleeves forwardly of the actuator pistons and their upper ends pivoted to the upper ends of said supports.

JOHNNIE C. COLLINS.

REFERENCES CITED

The following references are of record in the file of this patent:

UNITED STATES PATENTS

| Number | Name | Date |
|---|---|---|
| 1,785,122 | Hughes | Dec. 16, 1930 |
| 2,295,917 | Schwan | Sept. 15, 1942 |
| 2,306,313 | Johnson | Dec. 22, 1942 |
| 2,332,742 | Mott | Oct. 26, 1943 |
| 2,348,796 | Ferwerda, et al. | May 16, 1944 |
| 2,391,224 | Carter | Dec. 18, 1945 |
| 2,393,435 | Wachter | Jan. 22, 1946 |
| 2,404,820 | Wuertz, et al. | July 30, 1946 |
| 2,417,021 | Simmonds | Mar. 4, 1947 |
| 2,417,560 | McNamara, Jr. | Mar. 18, 1947 |
| 2,421,566 | Kober | June 3, 1947 |

FOREIGN PATENTS

| Number | Country | Date |
|---|---|---|
| 391,777 | Great Britain | Apr. 26, 1933 |